Patented June 16, 1925.

1,542,434

UNITED STATES PATENT OFFICE.

GUSTAV BONWITT, OF BERLIN, GERMANY.

COVERING OR CAPSULE FOR BOTTLES, JARS, OR THE LIKE, AND PROCESS FOR FABRICATING THE SAME.

No Drawing. Application filed March 8, 1924. Serial No. 697,952.

*To all whom it may concern:*

Be it known that I, Dr. GUSTAV BONWITT, a citizen of Germany, residing at Berlin, Germany, have invented certain new and useful Improvements in Coverings or Capsules for Bottles, Jars, or the like, and Processes for Fabricating the Same (for which I filed an application in Germany on March 3, 1923); and I do hereby declare the following to be a full, clear, and exact description of the invention, such as will enable others skilled in the art to which it appertains to make and use the same.

My invention relates to improvements in coverings or capsules for bottles, jars or the like and a process for fabricating the same.

Till now hermetical coverings of cellulose are so fabricated, that for instance suitable forms are dipped into liquids of viscose to be coagulated afterwards. These capsules must be kept wet till they are used, otherwise they do not shrink any more.

I have found that better results are obtained if the caps are pressed or blown of masses of cellulose esters or the like but in a dry process; afterwards they are desesterificated. These caps can be kept dry. Only before they are used they must be put into water for some time to receive water. So they extend and are able to shrink.

Such caps are for instance made in a usual way of celluloid or celluloid-like-compounds. Then they have to be desesterificated (those of celluloid for instance by a liquid of ammonium sulfide) washed and dried. For use they are put a short time into water and are placed loosely over the neck of the bottle or the like to be covered. By shrinking they cover tightly the thing and shut it hermetically.

I claim:

1. The method of manufacturing sealing coverings for bottles, jars, boxes, cases, or the like, consisting in making the respective shapes of a film containing compound-ethers, and desesterificating said shapes, substantially as set forth.

2. The method of manufacturing sealing coverings for bottles, jars, boxes, cases, or the like, consisting in making the respective shapes of a plastic film containing compound-ethers, and desesterificating said shapes, substantially as set forth.

3. The method of manufacturing sealing coverings for bottles, jars, boxes, cases, or the like, consisting in producing a film of a preparation containing compound-ethers, making the respective shapes of said film, and desesterificating said shapes, substantially as set forth.

4. The method of manufacturing sealing coverings for bottles, jars, boxes, cases, or the like, consisting in producing a film of a celluloid-like preparation containing compound-ethers, making the respective shapes of said film, and desesterificating and drying them.

5. The method of manufacturing sealing coverings for bottles, jars, boxes, cases, or the like, consisting in making the respective shapes of a film containing compound-ethers, and desesterificating said shapes by means of a solution of hydrosulphide of ammonium, substantially as set forth.

6. The method of manufacturing sealing coverings for bottles, jars, boxes, cases, or the like, consisting in producing a film of a plastic preparation containing compound-ethers, pressing the respective shapes of said film, and desesterificating them, substantially as set forth.

7. As new articles of manufacture: sealing coverings for bottles, jars, boxes, cases, and the like, consisting of desesterificated shapes made of films that contained compound-ethers, substantially as set forth.

DR. G. BONWITT.